(12) United States Patent
Dableh (10) Patent No.: US 11,268,804 B2
(45) Date of Patent: Mar. 8, 2022

(54) AUTOMATIC LIGHT POSITION DETECTION SYSTEM

(71) Applicant: JDRF Electromag Engineering Inc., Oakville (CA)

(72) Inventor: Roumanos Dableh, Oakville (CA)

(73) Assignee: JDRF ELECTROMAG ENGINEERING, INC., Oakville (CA)

( * ) Notice: Subject to any disclaimer, the term of this patent is extended or adjusted under 35 U.S.C. 154(b) by 0 days.

(21) Appl. No.: 16/812,266

(22) Filed: Mar. 6, 2020

(65) Prior Publication Data

US 2020/0208960 A1    Jul. 2, 2020

Related U.S. Application Data

(63) Continuation-in-part of application No. 15/584,639, filed on May 2, 2017, now Pat. No. 11,055,867.

(51) Int. Cl.
*G01B 11/00* (2006.01)
*G01B 11/06* (2006.01)

(52) U.S. Cl.
CPC ........ *G01B 11/002* (2013.01); *G01B 11/0608* (2013.01)

(58) Field of Classification Search
CPC .......................... G01B 11/002; G01B 11/0608
See application file for complete search history.

(56) References Cited

U.S. PATENT DOCUMENTS

| | | |
|---|---|---|
| 8,346,376 B2 | 1/2013 | Engelen et al. |
| 9,215,775 B1 | 12/2015 | Lunn et al. |

(Continued)

FOREIGN PATENT DOCUMENTS

| | | |
|---|---|---|
| AU | 2011316420 A1 | 6/2013 |
| CN | 101869004 A | 10/2010 |

(Continued)

OTHER PUBLICATIONS

NPL_ 266_1 Search Results, Jul. 8, 2021, 1 pp. (year: 2021).*
NPL_ 266_2 Search Results, Jul. 8, 2021, 1 pp. (year: 2021).*
NPL_ 266_3 Search Results, Jul. 8, 2021, 1 pp. (year: 2021).*

*Primary Examiner* — John E Breene
*Assistant Examiner* — Xiuqin Sun
(74) *Attorney, Agent, or Firm* — DLA Piper, LLP (US)

(57) ABSTRACT

There is provided a first positioning electronic device for use in a system of positioning electronic devices. The first positioning electronic device includes a first projector for projecting a structured light pattern on a reflective surface. In addition, the first positioning electronic device includes an image sensor for detecting all or part of one or more reflected structured light patterns projected using a second projector of a second positioning electronic device. Also, the first positioning electronic device include a communications transceiver for transmitting and receiving communication signals to the second positioning electronic device. The first positioning electronic device also includes a control logic processor for determining a relative position of the positioning electronic device relative to the second positioning electronic devices using the detected reflected structured light patterns. The first positioning electronic device further includes a locator to determine an absolute position in the system of positioning electronic devices.

20 Claims, 9 Drawing Sheets

(56) References Cited

U.S. PATENT DOCUMENTS

| | | | |
|---|---|---|---|
| 9,681,521 B2* | 6/2017 | Arulandu | H05B 47/155 |
| 10,028,358 B2 | 7/2018 | Ogg et al. | |
| 2006/0244719 A1 | 11/2006 | Brigham et al. | |
| 2007/0160373 A1* | 7/2007 | Biegelsen | H05B 47/195 |
| | | | 398/118 |
| 2011/0089841 A1 | 4/2011 | Radermacher et al. | |
| 2012/0059622 A1 | 3/2012 | Cacace et al. | |
| 2012/0120375 A1 | 5/2012 | Kilcher et al. | |
| 2013/0314597 A1 | 11/2013 | Kumamoto | |
| 2017/0067734 A1 | 3/2017 | Heidemann et al. | |

FOREIGN PATENT DOCUMENTS

| | | | |
|---|---|---|---|
| CN | 102273323 A | 12/2011 | |
| WO | WO2010079388 A1 | 7/2010 | |
| WO | WO2012048532 A1 | 4/2012 | |
| WO | WO2014147510 A1 | 9/2014 | |
| WO | WO2015189118 A1 | 12/2015 | |

* cited by examiner

AUTOMATIC LIGHT POSITION DETECTION SYSTEM

FIELD

This invention relates to the automatic detection and determination of fixture locations. More specifically, the invention relates to determining the relative position of fixtures.

BACKGROUND

A floor plan can be an effective visual tool used in the graphical user interfaces of building automation, space utilization, indoor way-finding, and indoor positioning systems. Floor plans are typically produced by architects or designers during the design and construction phase of the building. However, they generally do not include the accurate location of the components used by lighting systems, especially when systems are added or modified after the initial design phase of a building.

Consequentially, each system provider may produce, validate and maintain a distinct set of floor plans showing the location of the components. Often, providers use different software applications and floor plans cannot be easily shared, placing an added burden on building managers who already face a high degree of effort to maintain accurate floor plans throughout the lifecycle of a building.

Often much of the effort is spent manually ensuring that physical location of a device is correctly illustrated on a floor plan by comparing drawings to a physical space. In the case of a large building, the lighting control system may have thousands of sensors, luminaires and other control devices that may be accurately represented on the floor plan.

SUMMARY

This invention is directed to automatically determining the relative locations of lighting fixtures. Once the relative locations are determined, the locations can be indicated on an appropriate floor plan. The relative locations can be determined using structured light and coordination between light fixtures.

BRIEF DESCRIPTION OF THE DRAWINGS

In drawings which illustrate by way of example only,

FIG. 5A to 5I are schematic views by a receiving device of structured light emitted by an emitting device.

DETAILED DESCRIPTION

To determine relative positions of lights, unstructured or structured light projection and communications between the lights is used. The relative position can be defined in terms of the range and bearing between two devices.

Unstructured light is simple circular shape nominally projected by an emitting device, such as an LED. Structured light is a technique that uses a device with a light source to project a structured pattern of light onto an object. A structured pattern of light may be any projection of patterned light that can be detected and identified, such as a grid, or arcs of light and dark areas. The structured light pattern may be reflected off the floor, ground or other objects and may be captured by an image sensor of a receiving device. The device that projects the light and the device that receives the reflected image may be different and can be located some distance apart.

The receiving device performs geometric analysis on the received image to identify the unstructured or structured light in order to determine the distance between the receiving device and the object. It does this by determining the position and portion of the structured light projection is within the receiving device's view. In an embodiment, the receiving device may use machine learning based classification techniques to perform object detection on the received light.

In other applications of structured light, the system may know the relative position of the projector and the receiver and the projected structured light is used to determine the distance from the projector and receiver to the object reflecting the structured light or the shape of the object reflecting the structured light. For example, the Nintendo Wii used structured infrared light to determine the position and movement of the player relative to a combination light emitter/receiver. In the presently described system, the relative position of the projector and receiver is not initially known but may be determined using the structured light.

Time of flight methods use the known speed of light to determine the distance between two points. It may require that light travel from an emitter and return to a receiver that is co-located with the emitter, typically by reflecting the light off an object. A calculation is done on the time it takes the light to travel from the emitter, reflect off the object and be detected, to determine the distance the light has traveled. This may be done by multiplying the time by the speed of light and dividing by two to account for the light travelling the distance twice.

While time of flight methods may be used for several applications, in an embodiment, it may be used for measuring the height from a fixture to a reflective plane, such as a floor or table. This height measurement may be used to determine the ceiling height where the fixture is mounted and used to calibrate the structured light detection.

Figure 1:
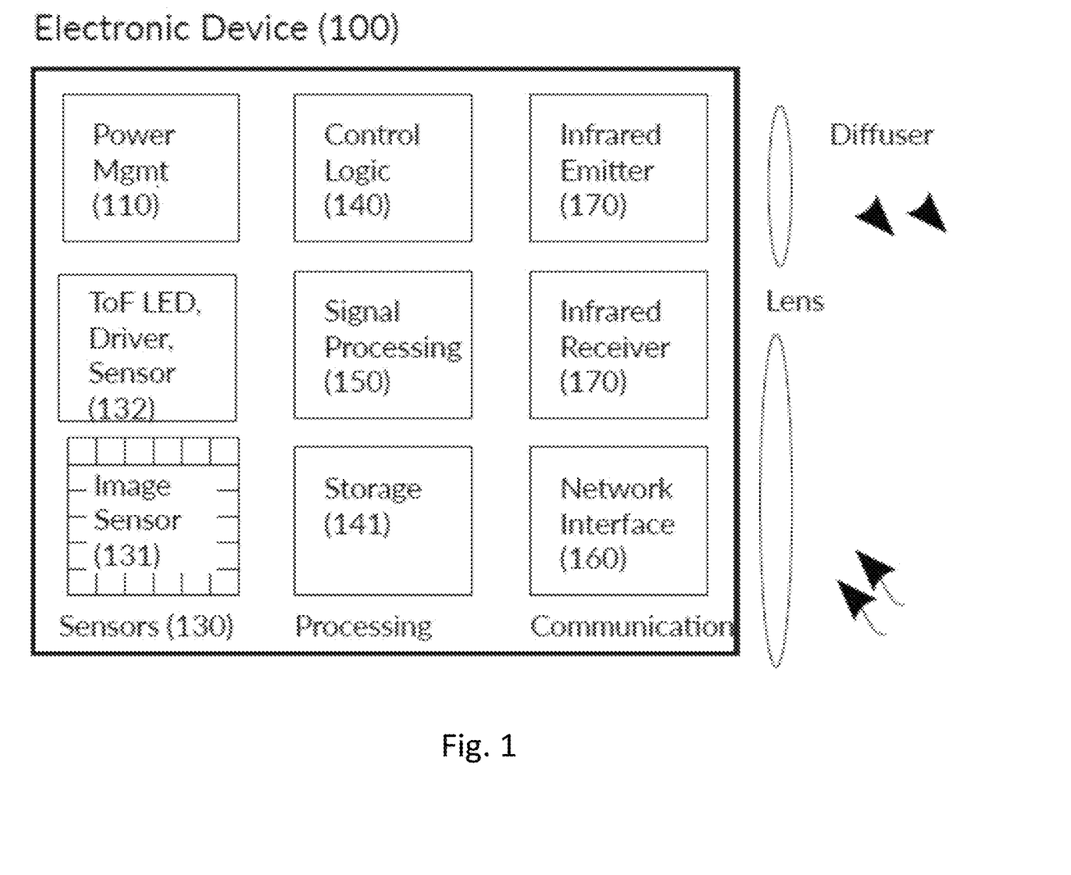
FIG. 1 a schematic view of a device that determines the unique identifier and relative position in accordance with an embodiment of the invention.

With reference to FIG. 1, a schematic view of a device that determines the identifier and relative position of one or more devices. The device may project a structured light image and communicate with other similar devices. The device may communicate using the transmission and receiving of signals with other similar devices. The communication signals may use infrared light and the devices may use lens such as a diffuser and collector for the communication signals. The device may transmit and receive signals using other communication signals such as wired, Bluetooth, NFC, Wi-Fi in addition to, or instead of infrared light. The devices may form a decentralized network by communicating from device to device using node-to-node communications, such as using infrared. This node-to-node communication may be a peer-to-peer network with no centralized control.

A unique identifier for each device may be communicating to other devices nearby or within the same group. An infrared light communication signal may self-limit such communications to devices physically close to the emitting device. Alternative types of communications signals, such as Wi-Fi, are longer range may include more devices within neighbouring devices.

Electronic device 100 may include the following subsystems: power management circuitry 110, various sensors 130, including but not limited to image sensor 131, time of flight sensor 132, control logic processing 140, data storage and memory 141, digital signal processing 150, network communication interface 160, visible or infrared communication emitter and receiver circuitry 170.

The power management circuitry 110 may convert the available power supply for use by the device, such as converting mains power to a lower voltage power. The circuitry 110 may connect to solar, EM energy harvester or other power sources. It may manage and adjust the power usage and power storage, on for example, batteries, depending on the power supply and usage. The image sensor 131 may be a low-resolution device that is capable of capturing the infrared emission of the infrared emitter 170. The resolution of the image sensor 131 can be sufficiently low such that it cannot be used for identification or recognition of building occupants.

Figure 2:
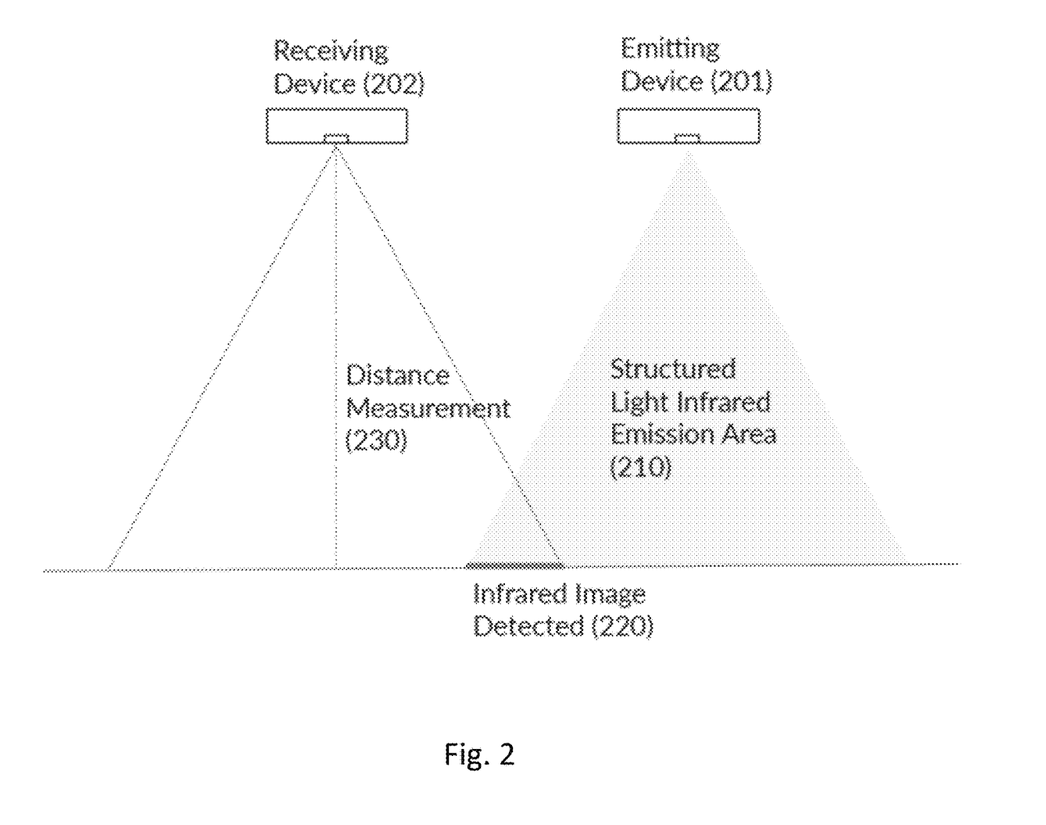
FIG. 2 is a schematic view of two devices in an embodiment of the invention mounted to a ceiling.

FIG. 2 is an illustration of front view of two devices, an emitting device 201 and a receiving device 202, mounted to a ceiling. The emitting device 201 may project a structured light image 210 onto the floor. The device 201 may use LEDs, lasers or other light emitting elements to project light on to the floor. The structured light may also be projected on other objects below the device such as tables, desks, chairs or even people.

A portion of the structured light image 220 may be reflected to the receiving device 202. Only a portion 220 of the projected image may be within the field of view of the image sensor of the receiving device. The receiving device may use a wide-angle lens on image sensor 131 to permit a large viewing angle. Using the detection of the full or partial view of the structured light, the receiving device may determine its relative position with respect to the emitting device.

The receiving device may determine which portion of the structured light image it can detect and the position of the structured light with regards to the device's location. If the height 230 from the device to the structured image is known, either from a time of flight sensor, or from being provided the height, the receiving the device can determine the expected size of the projected structured light image. If the distance of the device from the structured image is not known, the receiving device may estimate the distance from the size or spacing of the projected image. For example, if the projected structured light is in the form of a grid, the receiving device may determine the spacing of the grid lines. If the spacing of the grid lines is determined and assuming the distance of the projected light image from both the emitter or receiver device is known, the distance can be determined by the device. As another example, if the projected light is unstructured and in the form of a circle, the receiving device may use features such as the size, placement and intensity of the image to determine the relative position between the emitting device and the receiving device.

The time of flight sensor in the receiving device may be used to measure the height between the receiving device and the reflecting geometric plane, in some cases, the floor. The height from the receiving device and the reflecting geometric plane on which the structured image is projected may be used to assist with identifying the structured light pattern.

While FIG. 2 shows device 201 emitting the structured light and device 202 receiving the structured light, at times, device 202 may emit the structured light and 201 may receive the structured light. By having a first device detect the structured light projected by a second device and having the second device detect the structured light of the first device, the determination of the relative positions can be made more accurately, the system may be more accommodating of objects, such as tables and chairs, interfering with the projected light and allow for the position determination to occur with respect to additional devices.

Figure 3:
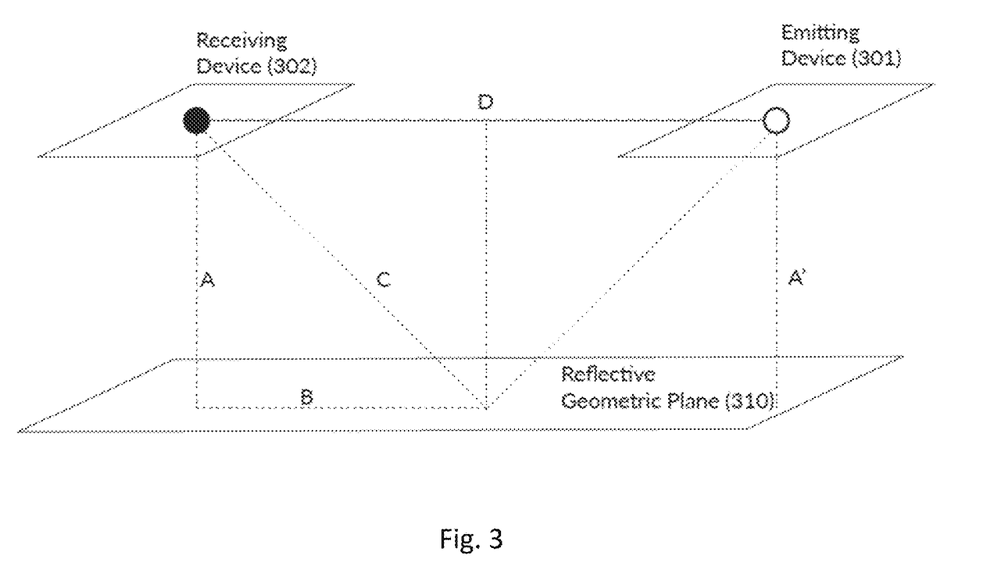
FIG. 3 is a schematic view of two devices in an embodiment of the invention mounted to a ceiling indicating some of the geometry.

FIG. 3 shows a perspective view of the distance (D) between the emitting device 301 and the receiving device 302 relative to the geometric plane used to reflect the structured light image. Initially, D may not be known. The distance between the receiving devices to the geometric plane 310 is denoted by A. The distance along the geometric plane and starting from a point directly beneath the receiving device and ending at the reflection point of the projected image is denoted by B. The hypotenuse between lines A and B is denoted by C. The emitting device and receiving device do not need to be on the same plane.

Through the use of the projection of structured light, the distance D between devices 302 and 301 may be determined. Time of flight sensors may be used to determine the distances A and A'.

Figure 4:
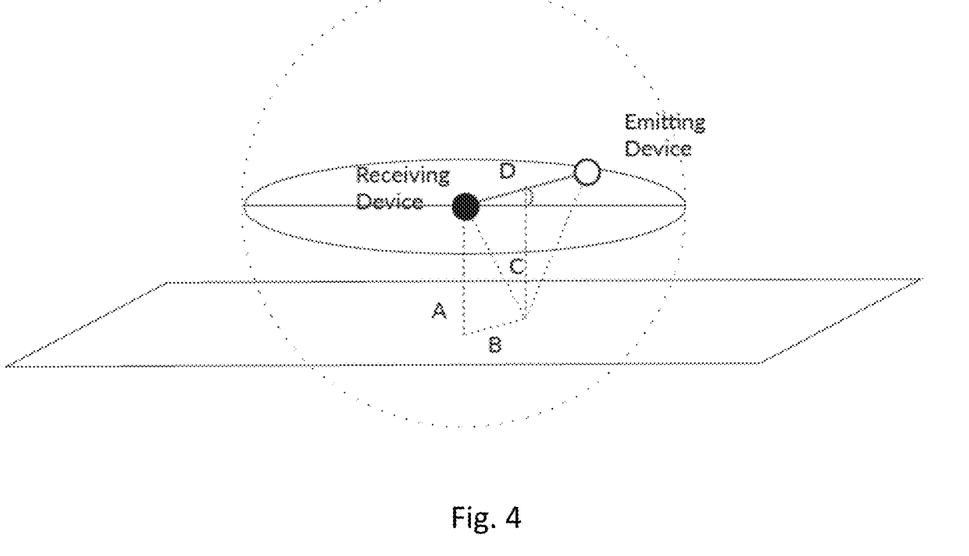
FIG. 4 is a schematic view of two devices in an embodiment of the invention mounted to a ceiling indicating some further geometry.
Figure 5A:
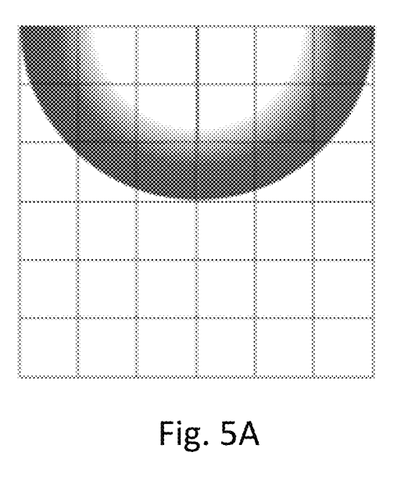
Figure 5B:
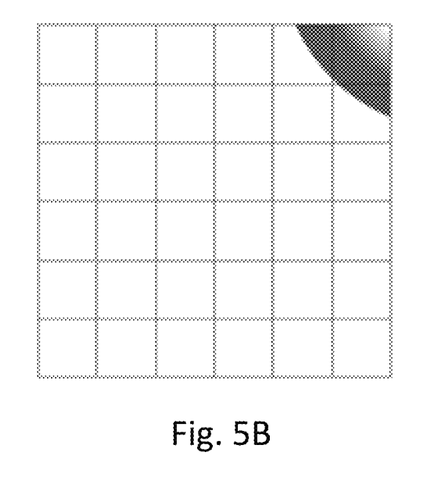
Figure 5C:
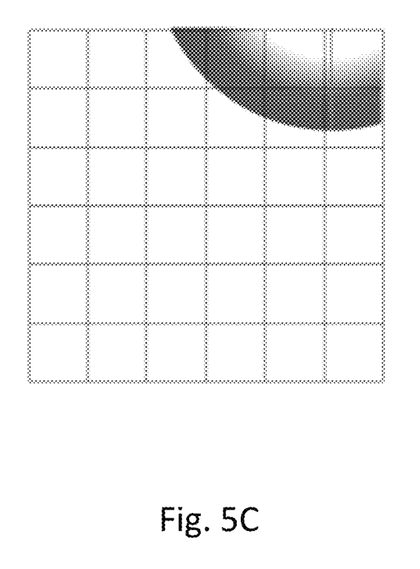
Figure 5D:
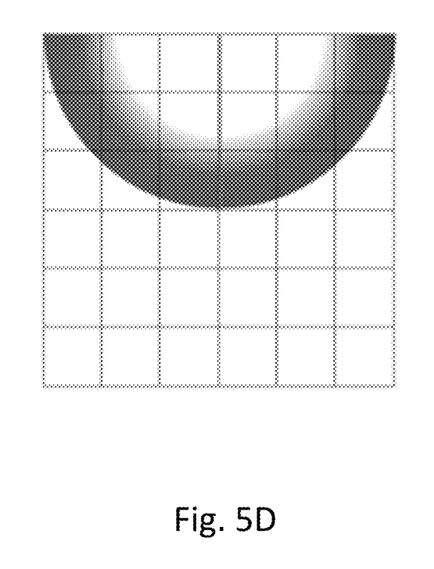
Figure 5E:
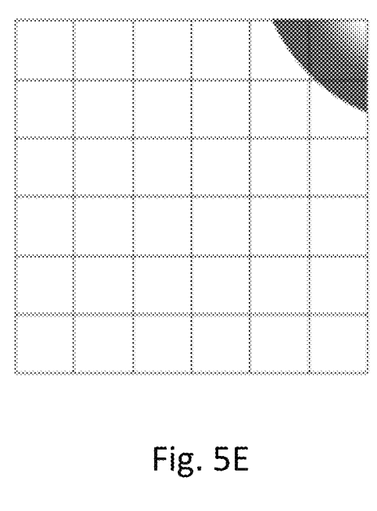
Figure 5F:
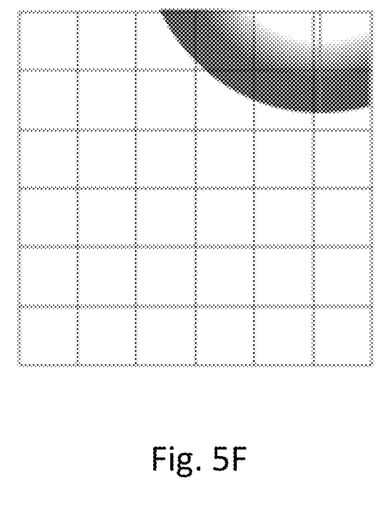
Figure 5G:
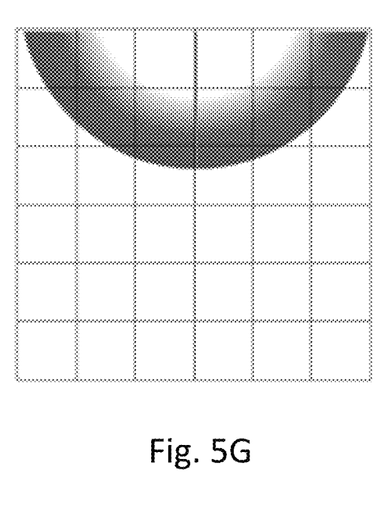
Figure 5H:
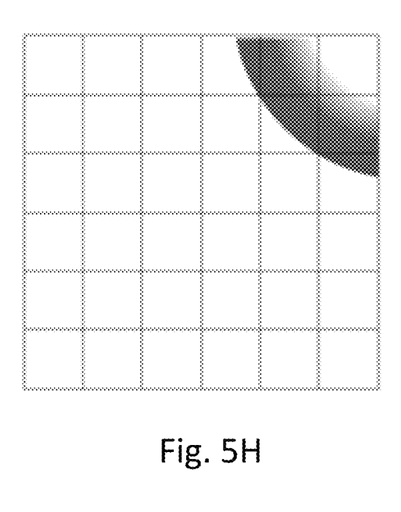
Figure 5I:
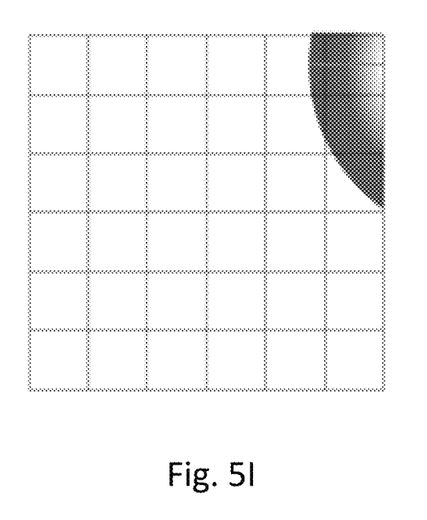

FIG. 4 shows a perspective of the angle between the emitting device and receiving device along a common plane as well as the distance (D) between them. The angle is not known initially. Through the use of the projection of structured light, the distance D and the angle may be determined.

FIGS. 5A through 5I shows a series of representations of the section of the structured light image received by the image sensor of the receiving device. The geometric configuration of the received image depends on the relative position (distance and bearing) between the emitting device and the receiving device. As an example, the structured light is a circle with a light/dark gradient with the centre of the circle directly below the emitting device. A receiving device may use the sign of the detected arc, and the portion of the arc it can detect to determine the centre of the projected structured light and hence the relative position of the device emitting the light.

A network of electronic devices 100 may each contain at least communication circuitry 170, light emitter and receiver circuitry 170 capable of projecting structured light, image sensor 131 and distance measurement circuitry, such as time of flight sensor 132. Each device 100 can be mounted on the ceiling or on a ceiling mounted luminaire or other building automation component. Each device may collect a set of distance and bearing measurements from itself to neighboring devices by detecting structured light projected by its neighbouring devices. The distance and bearing measurements are not particularly limited. In some examples, the distance measurements may have an accuracy of about 50 cm+/−10 cm and the bearing may have an accuracy of about 30°+/−15° for office building applications. In other examples, the accuracy may be more or less depending on the application.

Figure 6:
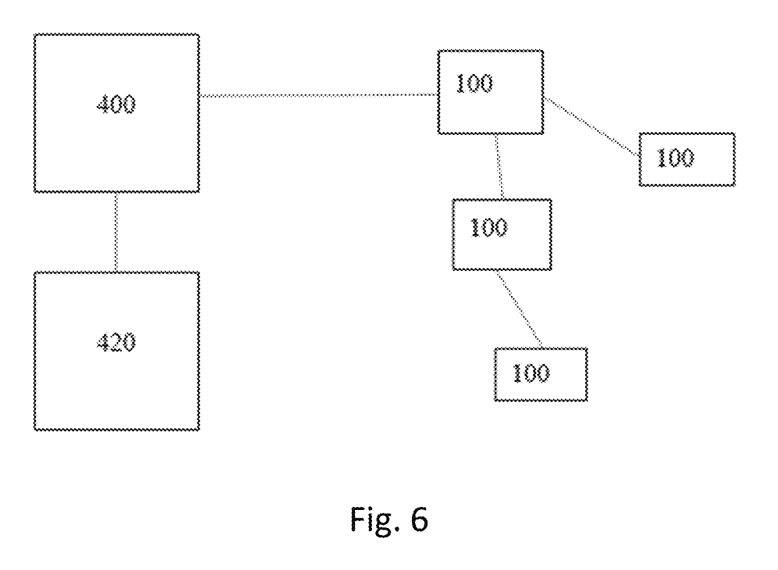
FIG. 6 is a schematic view of several devices connected over a peer-to-peer network with a controller and application.

With reference to FIG. 6, this data may be shared with other devices, a central controller 400 or publish to an application 420. Each device may communicate directly with the controller 400 or they may communicate via a peer-to-peer network between devices 100. The application 420 may collect data published by all the devices 100 and use the collective set of relative coordinates to calculate, display or render the relative positions of the devices and preferably the floor-plan. The relative positions or floor plan may be viewable on a mobile device, or computer running a web browser.

The image of sensing circuitry may consist of a low-resolution pixel array that may analyze the structured light pattern projected by other devices and visible within its field of view. In an embodiment, only one device may project its structured light at a time. The devices may communicate with each other to ensure that only one device is projecting its light at a time. In another embodiment, multiple devices may project simultaneously, and preferably, the structured light is unique to each device.

In an embodiment, a low-resolution image sensor is used to detect the structured light. In this way, the image sensor cannot inadvertently capture sensitive information from people, activities or documents under the device. This may reduce concerns about potential invasions of privacy, and cybersecurity.

By combining the height measurement with analysis of each received projected image, the distance and orientation from each device to all devices within its field of view can be determined. The height of the device from the projecting surface may be compared to the size of the projected structured image. The further the detecting device is from the reflecting surface, the smaller the structured light will appear to be. The location of the structured light within a device's field of view is used to determine the relative angle and distance to the emitting device.

With reference to FIG. 3, the height measurement determines A. The detection of the structured light may be used to calculate the distance B. The combination of A and B can be used to determine distance D.

With reference to FIG. 6, a structured light sensor of a device may detect only a portion of the structured light emitted by a neighbouring device in its field of view. For example, image (a) would indicate that the neighbouring emitting device is directly north from the detecting device. Similarly, image (b) indicates that the emitting device is north east of the detecting device. Image (c) also indicates that the emitting device is north-east but is closer than the emitting device of (b). The directions, north, north-east, etc. are provided as labels relative to the images indicated in FIG. 6. In an embodiment, the detecting device may have no detection of the absolute direction to neighbour devices. The use of structured light in this way can be used to determine the relative direction of neighbouring devices. In an embodiment, one or more device may include a compass, or GPS receiver to provide an absolute direction and/or location. For example, device A may be able to detect the structured projected image of device B, and device B may be able to detect the structured projected image of device C. Using the structured projected image, device A may be able to determine its relative position with respect to B and similarly B determine its relative position with respect to C. Using this information and communicating the relative positions to either other devices in a peer-to-peer manner, or communicating the information to a central application, the relative position of A and C can be determined.

A similar determination may be made with additional devices which can detect the projected images of at least one of the devices. If a device can detect the projected image of multiple devices, the determination of its relative position may be more accurate.

Devices may be distinguished from one another by encoding a unique identifier in an infrared communication signal to communicate to neighbouring devices that it is projecting its structured light. Each device may collect a set of data containing the relative distance and bearing measurements for each neighboring device that it detected, along with their unique identification number.

The software application may be able to plot all devices which can see each other's structured light patterns onto a floor plan using the relative coordinate system received by each device. If an absolute position and/or absolute direction is known, the orientation and position of the system of devices may be determined or fixed. A controller or operator may re-map or place additional devices on the floor plan if some devices are not within visible range of another device. For example, devices in a small room may determine the relative positions of themselves but have no ability to communicate with or detect the projected images of other devices.

Figure 7:
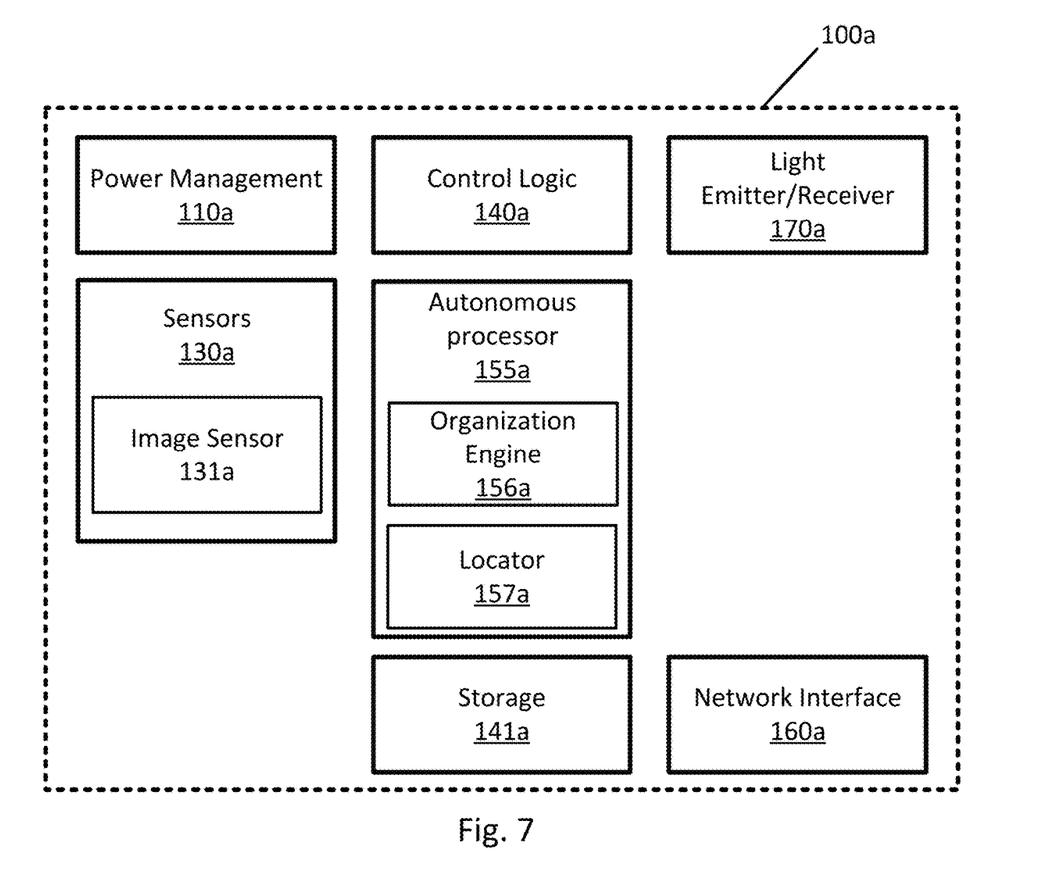
FIG. 7 is a schematic view of another device to carry out autonomous localization.

Referring to FIG. 7, a schematic view of another electronic device 100a is generally shown to provide localization in an autonomous and decentralized system. Like components of the electronic device 100a bear like reference to their counterparts in the electronic device 100, except followed by the suffix "a". In the present example, the electronic device 100a is to collect data and to transmit and to receive data with other electronic devices and operate autonomously without a central controller. In the present example, the electronic device 100a includes power management circuitry 110a, various sensors 130a, including but not limited to an image sensor 131a, a control logic processor 140a, data storage and memory 141a, autonomous processor 155a, communications transceiver 160a, such as a network interface, an infrared transceiver, or a radio transceiver, and light communication emitter and receiver circuitry 170a. The electronic devices 100a of the autonomous and decentralized system may self-organize, cooperate with each other and operate in a spontaneous manner to establish a set of absolute position coordinates across the system. It is to be appreciated by a person of skill with the benefit of this description that each electronic device 100a may exhibit homogenous behavior with other electronic devices in the system.

In the present example, the sensors 130a, such as the image sensor 131a, may be used for several applications, such as detecting an image projected from a neighbouring electronic device 100a. In addition, the sensors 130a, such as the image sensor 131a, may also be used for measuring the height of the electronic device 100a above the reflective plane, such as a floor or piece of furniture. The manner by which the image sensor 131a can measure the height above the reflective plane is not limited. For example, image sensor 131a may measure an intensity of the reflected light emitted from the same electronic device 100a to estimate the height. In another example, the image sensor 131a may measure the reflected structured light in a field of view to estimate the height based on feature detection of the reflected structured light. Upon obtaining the height of the electronic device 100a to the reflective plane, the height may be used to calibrate the structured light detection from other electronic devices.

Accordingly, the height can also be determined without the use of an explicit measurement technique such as time of flight. In an embodiment, the height can be determined by analyzing the received intensity of the reflected image. The receiving device may use machine learning based classification techniques to categorize the received image into two or more height categories.

In the present example, the autonomous processor 155a may perform similar functions of the control logic processor 140a and the signal processing unit 150. For example, the autonomous processor 155a may control the transmission of signals to other devices as well as process the signals from similar devices nearby. In addition, the autonomous processor 155a may process the images sent and received by the light communication emitter and receiver circuitry 170a. In the present example, the autonomous processor 155a may also include an organization engine 156a and a locator 157a.

The organization engine 156a is to organize the electronic device 100a in relation to other electronic devices to coordinate the activities of electronic devices within an area. It is to be appreciated by a person of skill with the benefit of this description that where multiple electronic devices 100a are installed, such as in a building, the electronic devices 100a are to coordinate with each other during a position detection procedure such that multiple lights within an area do not interfere with each other. In previous examples, a central controller 400 may be used to coordinate the electronic devices. However, in a decentralized system, the electronic devices 100a would need to self-organize to avoid conflicts during the position detection process. For example, in situations where two electronic devices 100a nearby emit the structured light simultaneously, the light from the two electronic devices 100a may interfere with each other. Accordingly, the organization engine 156a of each electronic device 100a may determine whether it is to turn off their emitter to toggle between an emitting state and a receiving state. In the emitting state, the electronic device 100a may activate a light emitter while deactivating the image sensor 131a with the circuitry 170a. In other examples, the image sensor 131a may remain active as it does not generate any interference. In the receiving state, the electronic device 100a may capture images reflected off a surface.

Each organization engine 156a may determine which one of the two electronic devices 100a is to yield to the other. For example, the electronic devices 100a in the system may carry out reciprocal measurement processes in accordance with an ordered sequence of operation. In a large-scale decentralized system, it is to be appreciated that no single device may be assumed to communicate or store data of all devices in the network. As such, the electronic devices 100a may employ decentralized network strategies to avoid interference and propagate information to all electronic devices 100a in the system. The manner by which the organization engine 156a makes the decision is not limited and may be accomplished based rules applied to the decentralized system to determine which of the electronic devices 100a would have priority over the other. For example, the electronic devices 100a may compare their network addresses or other unique identifiers and apply a rule, such as a higher or lower network address value is to receive priority. In other examples, variations to determining a minimum value across a decentralized network may be used.

Furthermore, it is to be appreciated that the measurement of distance between two electronic devices 100a may also not match in some situations such that a verification process may be used to obtain an accurate measurement. For example, the measurement of the distance between a first electronic device 100a and a second electronic device 100a may be different when the first electronic device 100a is emitting the structured light to the second electronic device 100a may from the distance measured when the second electronic device 100a is emitting the structured light to the first electronic device 100a. The difference may arise due to signal quality caused by a changing ambient light conditions at each of the electronic devices 100a. For example, a reflection off a surface may direct a large amount of light into an image sensor 131a of one device causing increased background noise or saturation of the image sensor 131a while the other image sensor 131a is not affected. In other examples, the difference may arise from the movement of furniture or other objects in the room resulting in different conditions between measurements.

In the present example, the differences between the measurements of the same distance may be managed by combining the data. For example, the average of the two values may be used as the distance. In other examples, each electronic device 100a may generate a confidence value of each result to be used in calculating a weighted average. In particular, if the distance measurement by the first electronic device 100a from reflected structured light emitted by the second electronic device 100a has a higher confidence score than the distance measurement by the second electronic device 100a from reflected structured light emitted by the first electronic device 100a, the former measurement may be given with more weight. The determination of the confidence value is not limited. For example, the confidence value may be determined based on a signal to noise ratio of the measurement at each electronic device 100a; however, other examples may use other methods to determine the confidence score.

The manner by which the organization engine 156a organized the position detection process is not limited. For example, the organization engine 156a may carry out a set of rules governing the process without the intervention of a central device or any human intervention. In particular, the organization engine 156a may receive the relative position measurements of nearby electronic devices 100a in response to signals from adjacent electronic devices carried out by the control logic processor 140a. To avoid interference with other electronic devices, the electronic devices 100 may alternate emitting and receiving the structured light from an adjacent electronic device 100a. Accordingly, each electronic device 100a may see the status of adjacent electronic devices 100a and not any device further away. The electronic device 100a may also store the relative positions between nearby electronic devices in the memory 141a.

In the present example, the memory 141a is not particularly limited and may include a non-transitory machine-readable storage medium that may be any electronic, magnetic, optical, or other physical storage device. The memory 141a may store instructions to operate the electronic device 100a and its components. For example, the memory 141a may store an operating system that is executable to provide general functionality to the electronic device 100a, including functionality to determine the distance between nearby electronic devices 100a. Examples of operating systems include Windows™, macOS™, iOS™, Android™, Linux™, and Unix™. The memory 141a may additionally store applications that are executable to provide specific functionality to the electronic device 100a, such as functionality to control various components such as the sensors 130a, the communications transceiver 160a, and the light emitter and receiver circuitry 170a.

In the present example, the memory 141a also store data about other electronic devices 100a in the system of electronic devices 100a. The memory 141a may be small and capable of storing the relative positions of a few nearby electronic devices 100a. Therefore, the information of all electronic devices 100a within an entire system of multiple electronic devices 100a may not be stored in the memory 141a. Accordingly, electronic devices 100a further apart may not have any information, such as identifier or positional information about each other. For such electronic devices 100a separated by a large distance to communicate with each other, such as to transmit control signals to one another or to receive sensor data, the messages are to be transmitted across one or more intermediate electronic device 100a in order to traverse the entire system of electronic devices. The manner by which the messages are sent between distant electronic devices 100a is not particularly limited. For example, a depth-first traversal method may be used send and receive messaged from one electronic device 100a to another electronic device 100a on the system. In this example, since the first electronic device 100a may not have the identifier of the second electronic device 100a stored in its memory 141a, the first electronic device 100a may use the depth-first traversal method to determine a path by which the message may be sent. It is to be understood that the depth-first traversal method may be substituted with other method used for decentralized networks.

The autonomous processor 155a may also operate a locator 157a to determine absolute positional coordinates of each electronic device 100a within the system of electronic devices. In the present example, each electronic device 100a may determine its relative position with adjacent electronic devices 100a using the control logic processor 140a. In the present example, if one electronic device 100a is selected as a reference point, the remaining electronic devices 100a in the system may ultimately determine its absolution position relative to the reference electronic device 100a. The selection of the reference electronic device 100a is not particularly limited. For example, the reference electronic device 100a closes to a predetermined location within a building, such as the main entrance, may be manually set to be the reference electronic device 100a. In other examples, the reference electronic device 100a may be selected randomly, or arbitrarily based on having the lowest or highest network address or media access control address. The manner by which the lowest or highest network address is determined is not particularly limited and may involve using a minimum or maximum finding process, such as those processes that are to be used in some decentralized systems. In particular, since each electronic device 100a generally cannot communicate with the entire system, each electronic device 100a is to use decentralized methods such as a series of comparisons to determine the reference electronic device 100a.

In operation, the locator 157a may receive positional coordinates, such as a Cartesian coordinate, from an adjacent electronic device 100a. The locator 157a may then determine the positional coordinate based on the coordinates received from other adjacent electronic devices 100a and the distance measurements from the control logic processor 140a. It is to be appreciated by a person of skill in the art that the data received from multiple adjacent electronic devices 100a may be used to verify the absolute position and/or to improve positional accuracy.

Accordingly, it is to be appreciated with the benefit of this description that the electronic device 100a may be part of a system that can configure and operate autonomously without intervention from a person or a central controller. Therefore, a system of several electronic devices 100a, such as for lighting a large area may be installed without any subsequent control software setup. This may allow for faster and more cost-effective installation of electronic devices 100a in a building or other area. In particular, the electronic device 100a may facilitate tasks such as group creation, floor plan rendering, and network configuration for controlling the electronic devices 100a.

Figure 8:
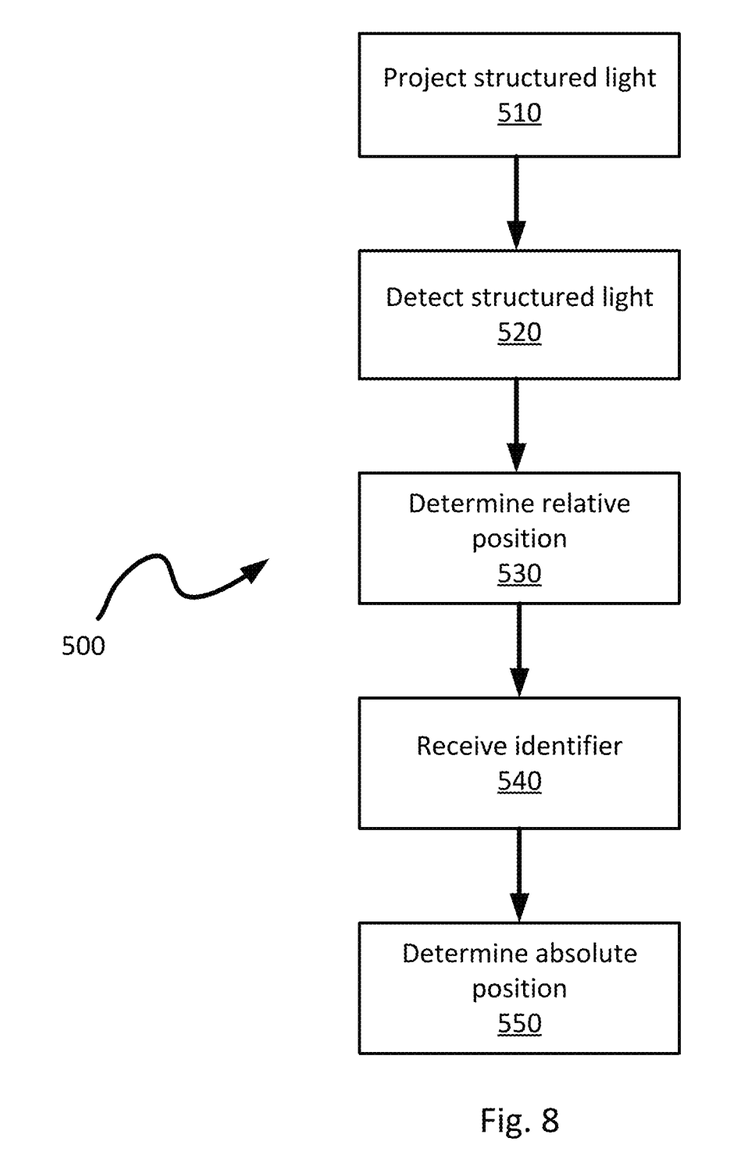
FIG. 8 is a flowchart of an example of a method of autonomous localization.

Referring to FIG. 8, a flowchart of an example method to provide localization in an autonomous and decentralized system is generally shown at 500. In order to assist in the explanation of method 500, it will be assumed that method 500 may be performed with the electronic device 100a. Indeed, the method 500 may be one way in which the electronic device 100a may be configured. Furthermore, the following discussion of method 500 may lead to a further understanding of the electronic device 100a. In addition, it is to be emphasized, that method 500 may not be performed in the exact sequence as shown, and various blocks may be performed in parallel rather than in sequence, or in a different sequence altogether.

Beginning at block 510, a first image is projected onto a reflective surface by an electronic device. The manner by which the image is projected is not particularly limited. For example, the image may be projected using an infrared light source, or another light source emitting within the visible spectrum of light.

Block 520 comprises detecting a portion of the structured light projected by block 510. The amount of the structured light detected may vary and depend on factors such as the spacing of the electronic devices 100a as well as the capabilities of the image sensor 131a. Once the structured light is detected, the control logic processor 140a proceeds to determine the relative position between electronic devices 100a at block 530.

Block 540 involves receiving an identifier from another electronic device 100a to identify the electronic device. In the present example, the identifier further includes an absolute position of the electronic device 100a associated with the received identifier. By knowing the absolute position of an electronic device 100a, the locator 157a may determine, at block 550, an absolute location by adding the relative position to the known absolute position. It is to be appreciated that the reference point by which the absolute position is measured is not particularly limited. Furthermore, since the absolute position may be inferred from nearby electronic devices 100a, not all electronic devices may be in communication with the each other, such that the absolute position is determined in a decentralized manner using communications with nearby electronic devices. The decentralized determination of the absolute position may also be carried out autonomously by the electronic devices 100a without any intervention. The determination of the positions may also be carried out periodically to account for any changes in the setup, such as from a renovation allowing the electronic devices 100a to be moved without any re-programming of a control system.

It should be recognized that features and aspects of the various examples provided above may be combined into further examples that also fall within the scope of the present disclosure.

What is claimed is:

1. A first positioning electronic device for use in a system of positioning electronic devices, the first positioning electronic device comprising:
   a first projector for projecting a first image on a reflective surface, wherein the first image is to be detected by a second positioning electronic device;
   an image sensor for detecting all or part of a second image projected from a second projector of the second positioning electronic device;
   a communications transceiver for transmitting outgoing communication signals to and receiving incoming communication signals from the second positioning electronic device;
   a control logic processor for determining a relative position of the second positioning electronic device based on the second image detected by the image sensor;
   a locator to determine an absolute position of the first positioning electronic device in the system of positioning electronic devices based on the relative position and incoming communications signals; and
   an organization engine, wherein the organization engine is to coordinate with the second positioning electronic device to reduce interference as the first projector projects the first image.

2. The first positioning electronic device of claim 1, further comprising a height detector for detecting a height from the first positioning electronic device to the reflecting surface on which the first projector may project the first image and the image sensor may detect the second image.

3. The first positioning electronic device of claim 1, wherein the communication transceiver receives an identifier from the second positioning electronic device, the identifier including an absolute position of the second positioning electronic device.

4. The first positioning electronic device of claim 1, wherein the communications transceiver is an radio transceiver.

5. The first positioning electronic device of claim 1, wherein the second image is a known pattern, and wherein the control logic processor calculates the relative position based on data measured by the image sensor of the second image.

6. The first positioning electronic device of claim 1, wherein the second image includes an identifier associated with the second positioning electronic device.

7. The first positioning electronic device of claim 1, wherein the control logic processor transmits relative positions of additional electronic devices to the second positioning electronic device.

8. The first positioning electronic device of claim 1, wherein the first positioning electronic device is a light fixture.

9. The first positioning electronic device of claim 1, wherein the locator determines the absolute position autonomously.

10. The first positioning electronic device of claim 1, wherein the organization engine is to toggle the first projector to reduce interference.

11. A method of determining a relative position of a first electronic device and a second electronic device, the method comprising:
    projecting, from the first electronic device, a first image on a reflective surface;
    detecting a portion of the first image at the second electronic device;
    determining a first relative position of the first electronic device from the second electronic device based on the portion of the first image detected;
    receiving an identifier from the first electronic device at the second electronic device, wherein the identifier includes a first absolute position of the first electronic device in a system of electronic devices;
    determining a second absolute position of the second electronic device in the system of electronic devices based on the relative position and the first absolute position; and
    coordinating with the second electronic device to reduce interference as a first projector projects the first image.

12. The method of claim 11, further comprising detecting a height from the second electronic device to the reflective surface with a height detector.

13. The method of claim 11, wherein the first electronic device is a first light fixture, and the second electronic device is a second light fixture, wherein each of the first light fixture and the second light fixture is mounted to a ceiling.

14. The method of claim 11, further comprising:
    projecting a second image on the reflective surface from the second electronic device;
    detecting a portion of the second image at the first electronic device;
    determining a second relative position of the second electronic device from the first electronic device based on the portion of the second image detected by the first electronic device; and
    comparing the first relative position and the second relative position measured to improve positional accuracy.

15. The method of claim 11, wherein receiving the identifier involves receiving a radio signal at a radio transceiver.

16. The method of claim 11, wherein determining the first absolute position is to be determined autonomously.

17. The method of claim 11, wherein coordinating the second electronic device further comprises toggling the first projector to reduce interference.

18. A non-transitory machine-readable storage medium encoded with instructions executable by a processor, the non-transitory machine-readable storage medium comprising:
    instructions to detect a portion of an image projected from an adjacent electronic device using an image sensor;
    instructions to determine a relative position of a positioning electronic device based on the image;
    instructions to receive an identifier from the adjacent electronic device, wherein the identifier includes an adjacent absolute position of the adjacent electronic device in a system of positioning electronic devices;
    instructions to determine a device absolute position of the positioning electronic device in the system of positioning electronic devices based on the relative position and the adjacent absolute position; and
    instructions to coordinate with a second electronic device to reduce interference as a first projector projects the image.

19. The non-transitory machine-readable storage medium of claim 18, further comprising instructions to detect a height from the positioning electronic device to a reflective surface with a height detector.

20. The non-transitory machine-readable storage medium of claim 18, wherein the instructions to determine the device absolute position include instructions to make a determination autonomously.

* * * * *